US 8,219,832 B2

(12) United States Patent
Breen, III et al.

(10) Patent No.: US 8,219,832 B2
(45) Date of Patent: Jul. 10, 2012

(54) METHODS AND SYSTEMS FOR MANAGING A VOLTAGE REGULATOR

(75) Inventors: John J. Breen, III, Harker Heights, TX (US); Shiguo Luo, Austin, TX (US); Colin A. Lambert, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 530 days.

(21) Appl. No.: 12/411,392

(22) Filed: Mar. 26, 2009

(65) Prior Publication Data

US 2010/0250913 A1  Sep. 30, 2010

(51) Int. Cl.
*G06F 1/00* (2006.01)
*G05F 1/10* (2006.01)

(52) U.S. Cl. ........ 713/300; 323/234; 323/282; 323/285; 713/340

(58) Field of Classification Search ........ 323/234, 323/265, 282, 285
See application file for complete search history.

(56) References Cited

U.S. PATENT DOCUMENTS

| | | | | |
|---|---|---|---|---|
| 5,539,630 A * | 7/1996 | Pietkiewicz et al. | ............ | 363/17 |
| 5,973,367 A | 10/1999 | Williams | | |
| 6,674,274 B2 * | 1/2004 | Hobrecht et al. | ............. | 323/285 |
| 7,804,733 B2 * | 9/2010 | Alexander et al. | ............. | 323/285 |
| 7,825,642 B1 * | 11/2010 | Young et al. | .................. | 323/224 |
| 2007/0139973 A1 * | 6/2007 | Leung | ............... | 363/16 |
| 2008/0024100 A1 * | 1/2008 | Huang et al. | ................... | 323/282 |
| 2008/0197823 A1 * | 8/2008 | Crowther et al. | ............. | 323/271 |
| 2009/0196072 A1 * | 8/2009 | Ye | .................. | 363/17 |
| 2009/0267578 A1 * | 10/2009 | Luo et al. | ....................... | 323/272 |
| 2011/0080151 A1 * | 4/2011 | Rahardjo et al. | .............. | 323/285 |

* cited by examiner

*Primary Examiner* — Mark Connolly
(74) *Attorney, Agent, or Firm* — Baker Botts L.L.P.

(57) ABSTRACT

A method for increasing efficiency of a voltage regulator in an information handling system (IHS) is provided. The method may include enabling one or more operating phases associated with the voltage regulator and initializing a switch configuration having at least one high-side switch and at least one low-side switch. In addition, the may method include initializing a dead-time value, sensing a load current, and adjusting the number of operating phases, the switch configuration, or the dead-time value in response to the load current.

15 Claims, 5 Drawing Sheets

METHODS AND SYSTEMS FOR MANAGING A VOLTAGE REGULATOR

TECHNICAL FIELD

The present disclosure relates generally to the field of information handling systems, and more specifically, to managing a voltage regulator with an information handling system.

BACKGROUND

As the value and use of information continues to increase, individuals and businesses seek additional ways to process and store information. One option available to users is an information handling system (IHS). An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for such systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Furthermore, an IHS may include a voltage regulator to provide a constant voltage level and a current to power the system. For example, a voltage regulator may receive an input voltage and produce an output current at a predetermined output voltage required by a load, i.e., the circuit element(s) for which it is providing power. Moreover, modern IHSs may include components that maintain current requirements across a broad range from relatively high peak currents to very low stable currents. More particularly, voltage regulators may be required to maintain a high efficiency, or low power loss, over such ranges. In particular, a direct current to direct current (DC-DC) voltage regulator may include a controller, one or more drivers, and one or more power stages. Furthermore, a power stage may include one or more metal-oxide-semiconductor-field-effect-transistors (MOSFETs), which may be driven by the drivers.

Additionally, some voltage regulators may be capable of operating in multiple phases. To this end, the concept of a phase for a voltage regulator may typically refer to combining a driver and a power stage to form one phase. Thus, a multi-phase voltage regulator may include multiple instances of such combinations. Alternatively, a multi-phase voltage regulator may be thought as a combination of single phase voltage regulators. For example, a multi-phase voltage regulator may include a plurality of single phase voltage regulators coupled in parallel to provide varying ranges of output current. During periods of high loads, the multi-phase voltage regulator may function with all phases in operation. In contrast, for low loads, it may employ phase-shedding and operate with a reduced number of phases.

Still, certain inefficiencies may arise due to the internal circuit designs of voltage regulators. For instance, different (MOSFET) configurations within a power stage may contribute to varying levels of power loss depending on different load ranges. Furthermore, the dead time, which may refer to a time of inactivity between turning one MOSFET on and another off, between high-side and low-side MOSFETs may also have an impact on efficiency. Thus, there is a need to dynamically adjust MOSFET configurations and dead times within a voltage regulator according to the load current.

SUMMARY

The following presents a general summary of several aspects of the disclosure in order to provide a basic understanding of at least some aspects of the disclosure. This summary is not an extensive overview of the disclosure. It is not intended to identify key or critical elements of the disclosure or to delineate the scope of the claims. The following summary merely presents some concepts of the disclosure in a general form as a prelude to the more detailed description that follows.

One aspect of the disclosure provides for a method for managing a voltage regulator in an information handling system (IHS). The method may include enabling one or more operating phases associated with the voltage regulator. The method may further include initializing a switch configuration within the voltage regulator, the switch configuration having at least one high-side switch and at least one low-side switch. In addition, the method may include initializing a dead-time value corresponding to a time interval where both the at least one high-side switch and the at least one low-side switch are powered off. Additionally, the method may include sensing a load current through the voltage regulator and adjusting the number of operating phases, the switch configuration, or the dead-time value in response to the load current reaching a predetermined value.

Another aspect of the present disclosure provides for an information handling system (IHS) which may include a central processing unit (CPU). Furthermore, the IHS may include a voltage regulator in communication with the CPU. The voltage regulator may include a first driver in communication with a high-side switch, wherein the first driver includes a first shedding control and a second driver in communication with a low-side switch, wherein the second driver includes a second shedding control. The voltage regulator may also include a control section in communication with the first driver and the second driver, wherein the control section is operable to whether a load current has reached a predetermined value.

A further aspect of the present disclosure provides for a method for managing a voltage regulator configured to enable one or more operating phases. The method may include determining whether a load current has reached a predetermined value. Furthermore, the method may include adjusting the number of operating phases, a switch configuration, and a dead-time value if the load current has reached the predetermined value. Additionally, the switch configuration may include at least one high-side switch and at least one load side switch Yet another aspect of the present disclosure provides for a computer-readable medium having computer executable instructions for performing a method for managing a voltage regulator in an information handling system (IHS). The method may include enabling one or more operating phases associated with the voltage regulator. The method may further include initializing a switch configuration within the voltage regulator, the switch configuration having at least one high-side switch and at least one low-side switch. In addition, the method may include initializing a dead-time value corresponding to a time interval where both the at least one high-side switch and the at least one low-side switch are powered off. Additionally, the method may include sensing a load current through the voltage regulator and adjusting the number of operating phases, the switch configuration, or the dead-time value in response to the load current reaching a predetermined value.

BRIEF DESCRIPTION OF THE DRAWINGS

For detailed understanding of the present disclosure, references should be made to the following detailed description of the several aspects, taken in conjunction with the accompanying drawings, in which like elements have been given like numerals and wherein.

DETAILED DESCRIPTION

Before the present systems, methods, and computer-readable mediums are described, it is to be understood that this disclosure is not limited to the particular apparatus, systems and methods described, as such may vary. One of ordinary skill in the art should understand that the terminology used herein is for the purpose of describing possible aspects, embodiments and/or implementations only, and is not intended to limit the scope of the present disclosure which will be limited only by the appended claims.

It must also be noted that as used herein and in the appended claims, the singular forms "a", "and", and "the" may include plural referents unless the context clearly dictates otherwise. Thus, for example, reference to "a switch" refers to one or several switches and reference to "a method of processing" includes reference to equivalent steps and methods known to those skilled in the art, and so forth.

For purposes of this disclosure, an embodiment of an Information Handling System (IHS) may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS may be a personal computer, a storage device, or any other suitable device and may vary in size, shape, performance, functionality, and price. The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, and a video display. The IHS may also include one or more buses operable to transmit data communications between the various hardware components.

Figure 1:
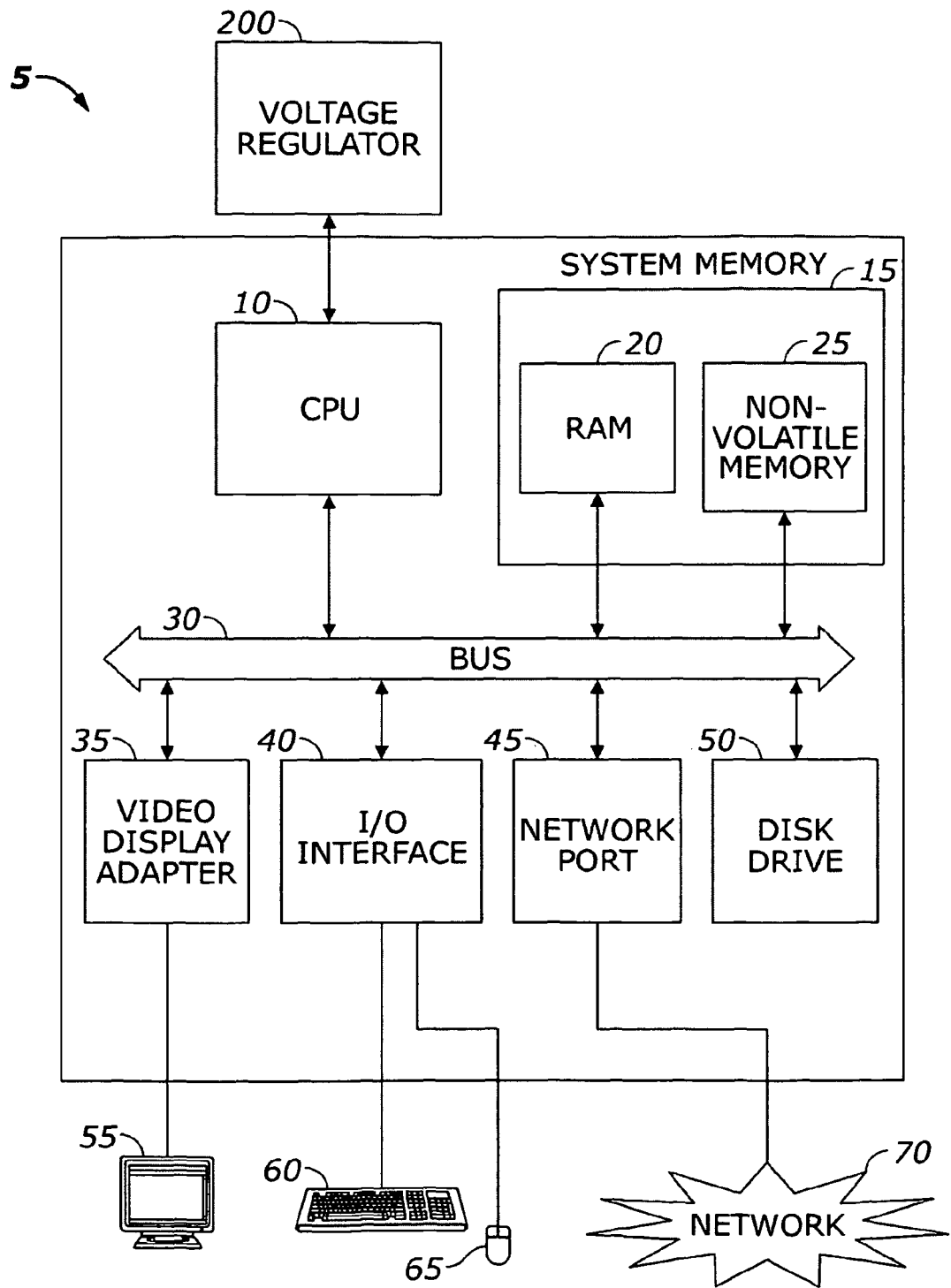
FIG. 1 represents an information handling system (IHS) in accordance with one aspect of the present disclosure.

FIG. 1 illustrates one possible implementation of an IHS 5 comprising CPU 10. It should be understood that the present disclosure has applicability to IHSs as broadly described above, and is not intended to be limited to the IHS 5 as specifically described. The CPU 10 or controller may comprise a processor, a microprocessor, minicomputer, or any other suitable device, including combinations and/or a plurality thereof, for executing programmed instructions. It is appreciated that execution of the algorithm to be described below may occur in the processor or the CPU 10. The CPU 10 may be in data communication over a local interface bus 30 with components including memory 15 and input/output interfaces 40. The system memory 15, as illustrated, may include non-volatile memory 25. The non-volatile memory 25 may include, but is not limited to, flash memory, non-volatile random access memory (NVRAM), and electrically erasable programmable read-only memory (EEPROM). The non-volatile memory 25 may contain a firmware program (not shown) which may contain programming and/or executable instructions required to control a keyboard 60, mouse 65, video display 55 and/or other input/output devices not shown here. This type of firmware may be known as a basic input/output system (BIOS). The system memory 15 may also comprise random access memory (RAM) 20. The operating system and application programs (e.g., graphical user interfaces) may be loaded into the RAM 20 for execution.

The IHS 5 may be implemented with a network port 45 to permit communication over a network 70 such as a local area network (LAN) or a wide area network (WAN), such as the Internet. As understood by those skilled in the art, IHS 5 implementations may also include an assortment of ports and interfaces for different peripherals and components, such as video display adapters 35, disk drives port 50, and input/output interfaces 40 (e.g., keyboard 60, mouse 65).

Furthermore, the IHS 5 may multiple voltage regulators that regulate input voltage from a power source to a specific voltage required by various IHS components, such as CPU, memory, and/or the like. Specifically the IHS 5 may include a voltage regulator 200 coupled to the CPU 10 to provide a constant level of power to the CPU 10 according to its power requirements. To this end, the voltage regulator 200 may use a negative feedback loop by comparing its actual output voltage to an internal fixed reference voltage. If the output voltage is less than or below a predetermined level, the voltage regulator 200 may produce a higher voltage. On the other hand, if the output voltage greater than or above a predetermined level, the voltage regulator 200 may either produce a lower voltage or stop sourcing current. If the voltage regulator 200 is chosen to stop sourcing current, it may depend on the current draw of the device it is driving, e.g., CPU 10*a-b*, to pull the voltage back down. In this manner, the voltage regulator 200 may maintain the output voltage at a relatively constant level. Additionally, the voltage regulator 200 may be capable of operating in multiple phases and may be operable to supply high output currents. To this end, a multiphase voltage regulator may be able to reduce the amplitudes of input and output ripple current as well as output ripple voltage. Furthermore, during periods of lighter load requirements, a multiphase voltage regulator may be capable or reducing the number of operating phases to increase the efficiency of the voltage regulator.

Figure 2:
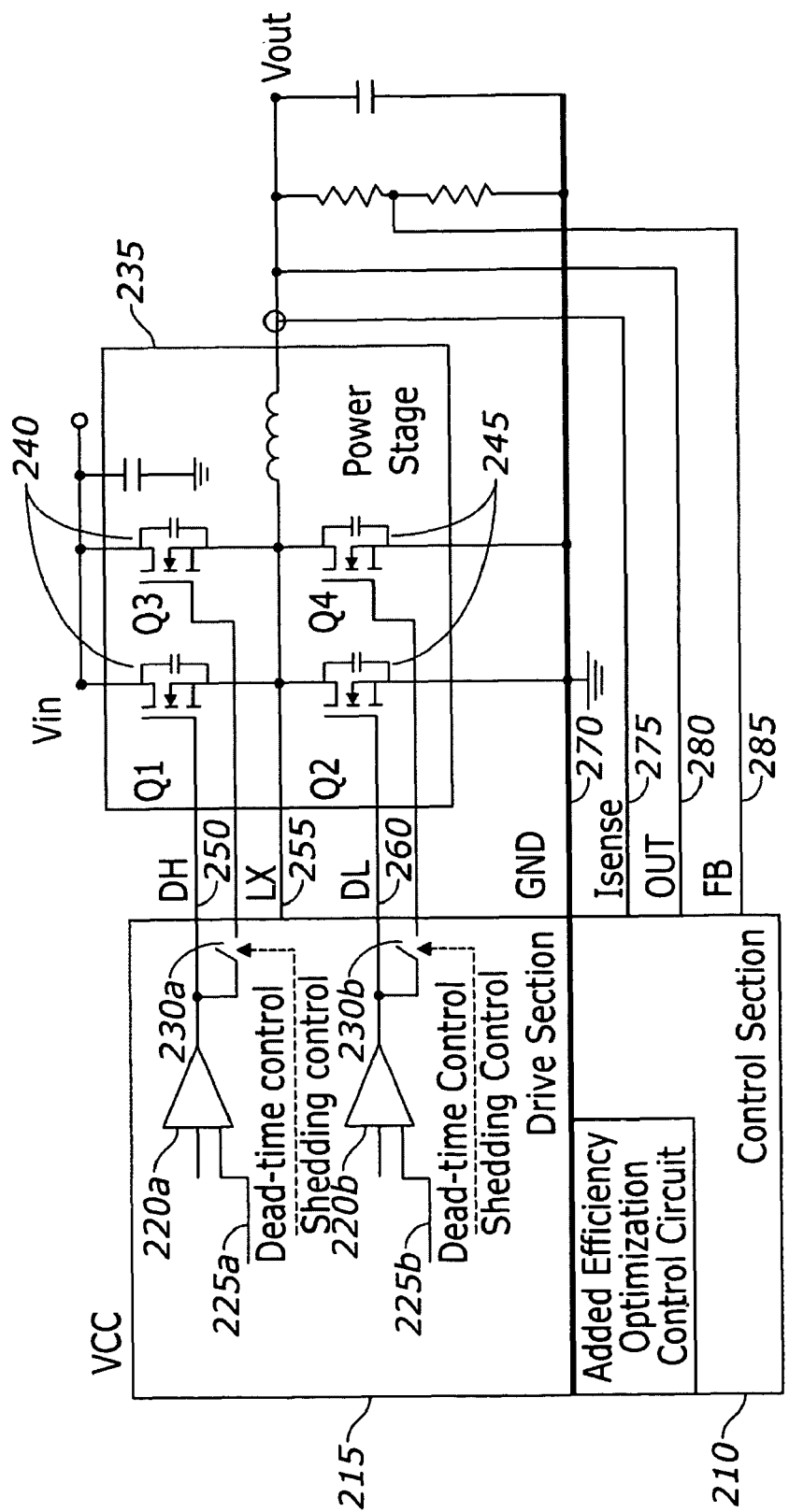
FIG. 2 represents a voltage regulator in accordance with one aspect of the present disclosure.

Turning now to FIG. 2, a schematic illustrating, a voltage regulator 200 is provided in accordance with one aspect of the present disclosure. The voltage regulator 200 may include a control section 210 coupled to a drive section 215 and a power stage 235. The drive section 215 may include drivers 220*a-b* that control current to switches 240, 245 within the power stage 235. As depicted in FIG. 2, the high-side, driver 220a may regulate current through the DH (drive high) path 250 to the high-side switches 240 indicated by Q1 and Q3. Similarly, the low-side driver 220b may control current through the DL (drive low) path 2560 to the low-side switches 245 indicated by Q2 and Q4. Generally, a high-side switch may refer to a switch located between the positive terminal of a power supply and a load while a low-side switch may refer to a switch located between a load and the negative terminal of a power supply or ground. Furthermore, various electronic components may be used for the high-side switches 240 and low-side switches 245 such as metal-oxide-semiconductor field-effect transistors (MOSFETS) or any other suitable switching device. The LX signal 255, which may also be referred to as the phase node, may indicate a junction point between the high-side switch(es) 240 and low-side switch(es) 245 and may be fed back into the drive section 215 to provide a reference voltage for the high-side switch(es) 240. The low-side switch(es) 245, on the other hand, may be referenced to ground 270.

Additionally, the drivers 220a-b may also include dead-time controls 225a-b and shedding controls 230a-b respectively. Dead-time may refer to the time needed between turning a high-side switch 240 on and a low-side switch 245 off and/or vice-versa. Thus, during the dead-time neither the high-side switch 240 nor the low-side switch 245 will be on. Dead-time may be necessary to prevent high-side switch(es) 240 and low-side switch(es) 245 from simultaneously turning on. Indeed, having both switches on at the same time may cause cross-conduction and/or a short circuit and damage the circuit. Generally, however, having a small dead-time may increase the efficiency of the voltage regulator 200 as a whole depending on the configuration of the switches within the power stage 235. Therefore, dead-time control(s) 225a-b may enable adjustments of the dead-time in order to obtain a desired efficiency level. As used herein, the efficiency of the voltage regulator 200 may refer to the percentage of power actually output by the voltage regulator 200 and not lost to heat or other form of energy. Furthermore, while FIG. 2 depicts the dead-time control 225a-b to be associated with the drive section 215 of the voltage regulator 200, the dead-time control 225a-b may also be implemented in any other suitable area such as the control section 210 and/or the like.

In addition, each driver 220a-b may also include shedding controls 230a-b respectively. As depicted in FIG. 2, a shedding control 230a may be a simple switch that may turn on or off the high-side switch 240 Q3. Similarly, shedding control 230b may control the on and/or off state of low-side switch 245 Q4. To this end, the shedding controls 230a-b may enable the voltage regulator 200 to adaptively configure its high-side 240 and low-side 245 switches according to various factors, e.g., the load current, to achieve a desired efficiency level. For example, Isense 275 may measure the load current and feed it back into the control section 210. Based on this measurement, the control section may direct the dead-time controls 225a-b and shedding controls 230a-b to alter the dead-time and switch configuration, respectively, to adjust for the desired efficiency. The switch configuration, as used herein, may refer to the combination of high-side switches 240 and low-side switches 245 that are turned on and/or off. Specific implications of various switch configurations and dead-times are further illustrated by the graph in FIG. 3.

Moreover, it should be noted that FIG. 2 depicts the voltage regulator 200 with a single phase for the sake of simplicity. Indeed, one skilled in the art would understand that the voltage regulator 200 may also be capable of operating in multiple phases. Furthermore, each operating phase may include its own control section, drive section, and power stage, for example, which may have similar functionality as the corresponding components illustrated in FIG. 2. For instance, each operating phase may also have dead-time controls 225a-b and shedding controls 230a-b which may adjust dead-time and switch configurations to achieve a high efficiency for the voltage regulator 200. Additionally, though FIG. 2 illustrates a voltage regulator 200 having two high-side switches 240 and two low-side switches 245, the present disclosure is not limited to the specific configuration shown and in fact contemplates all such combinations of high-side and low-side switches.

Figure 3:
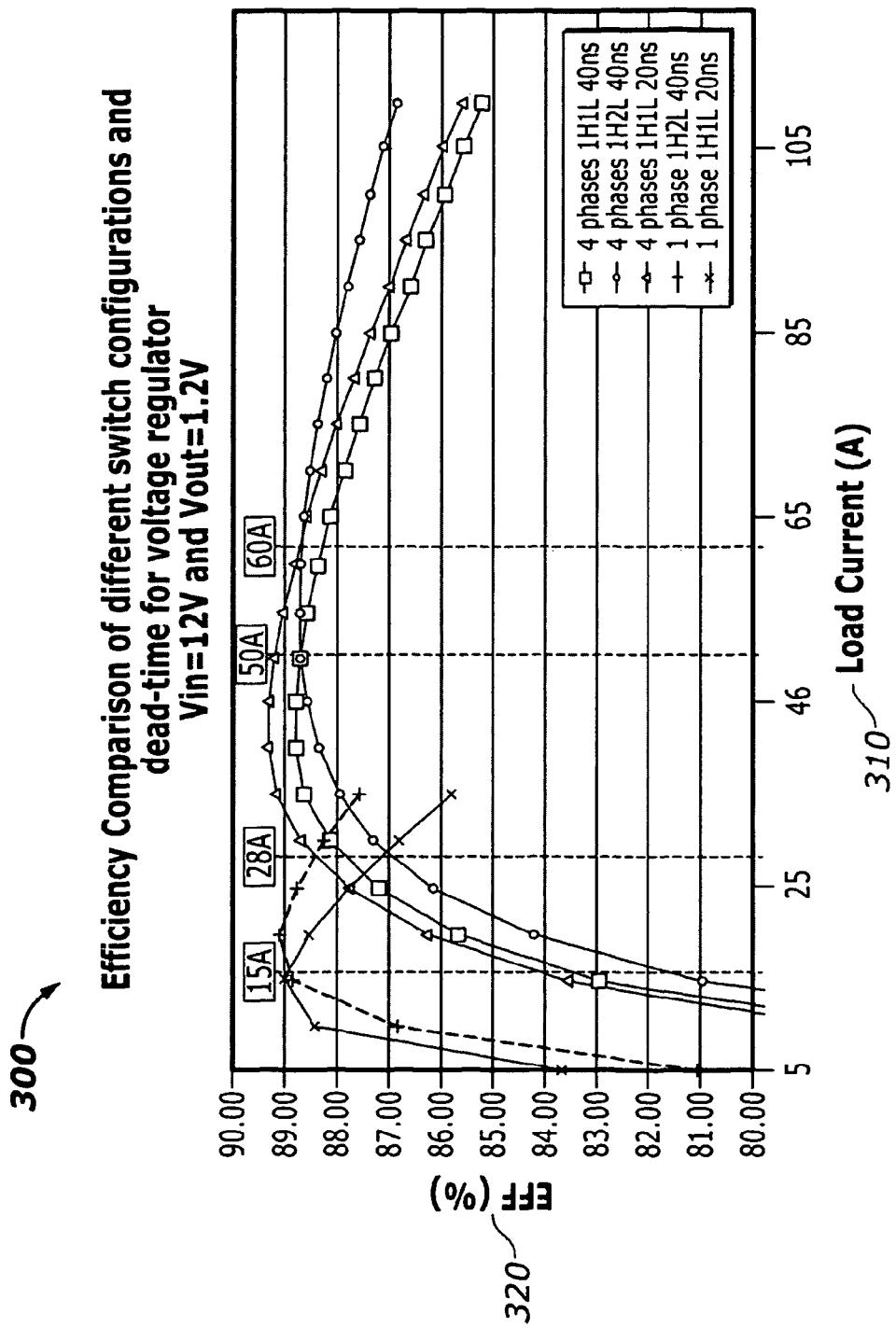
FIG. 3 provides a graph illustrating the efficiencies of a voltage regulator in accordance with one aspect of the present disclosure.

Turning to now to FIG. 3, a graph is provided, indicated generally at 300, illustrating a comparison of the efficiencies 320 of various switch configurations and dead-time values within a multi-phase voltage regulator according to different load currents 310 (measured in Amperes). While FIG. 3 depicts the graph using a voltage input of 12V and a voltage output of 1.2V under controlled conditions, it should be noted that the present disclosure is not restricted to these limitations. FIG. 3 merely illustrates that varying efficiencies in a voltage regulator may occur in response to different switch configurations and dead-time adjustments. Therefore, the present disclosure encompasses all such configurations and adjustments under all other conditions, inputs, outputs, load ranges, and/or the like.

As depicted in FIG. 3, the voltage regulator 200 may have varying efficiency levels in different load ranges depending on numerous factors including, but not limited to, the number of phases the voltage regulator is employing, its switch configuration, and its dead-time value. For example, for a voltage input of 12V, a voltage output of 1.2V, a load range of less than 15 Amps (A), the most efficient configuration of the five shown may, be a voltage regulator operating in a single phase, with one high-side switch and one low-side switch, and a dead-time of 20 nanoseconds (ns). Under similar conditions with loads of 60 A or greater, the configuration with the highest efficiency may be a voltage regulator operating in four phases, with one high-side switch and two low-side switches, and a dead-time of 40 ns. Further, as shown in FIG. 3, other configurations may provide for the best efficiency for other load ranges. Thus, based on this type of information, a voltage regulator with the ability to adapt certain internal characteristics to supply current to a load at a preferred efficiency level, such as the one depicted in FIG. 2, may be desirable.

Figure 4:
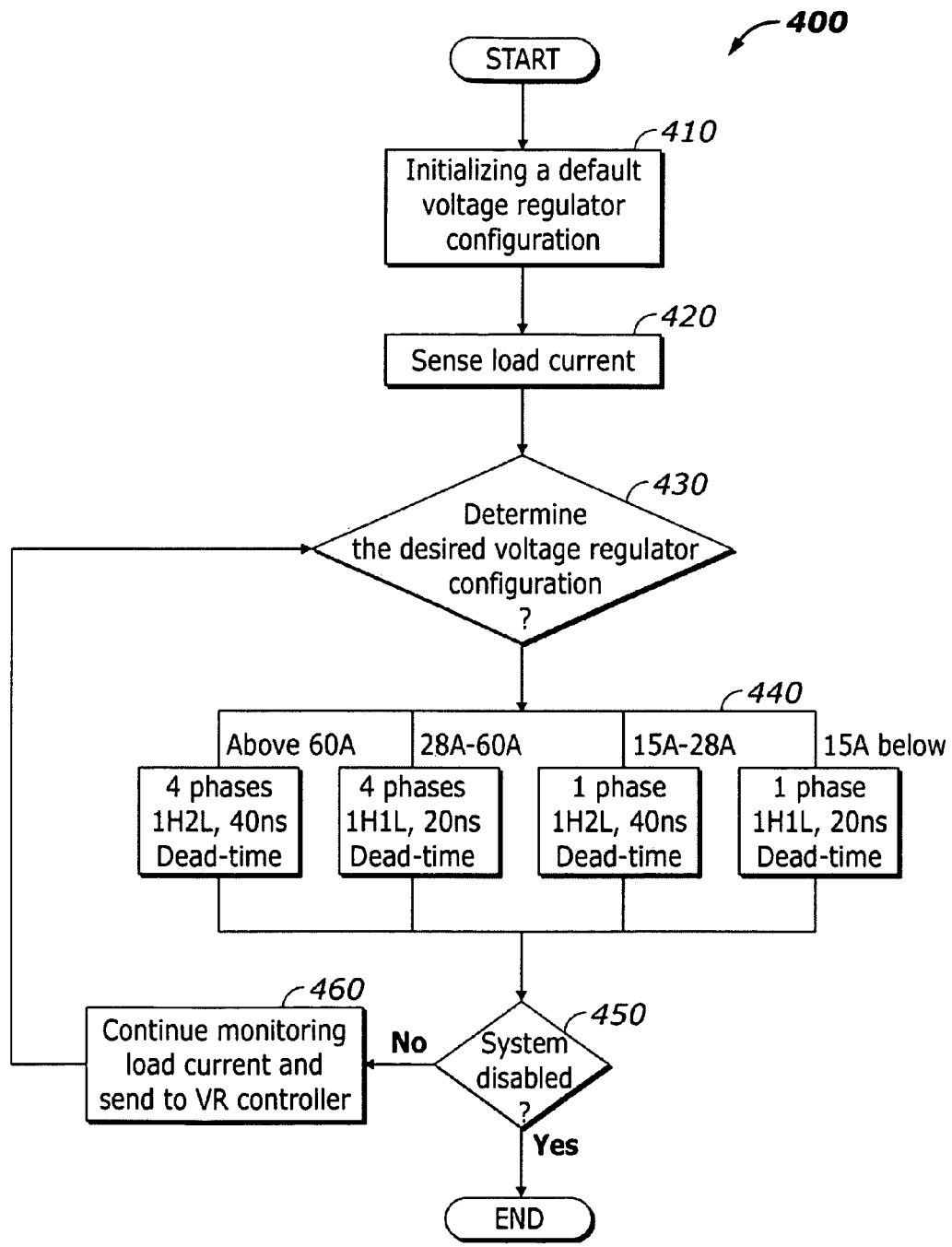
FIG. 4 provides a flow diagram illustrating a method for increasing the efficiency of a voltage regulator in accordance with one aspect of the present disclosure.

Similarly, FIG. 4 may provide a method, indicated generally at 400, by which a voltage regulator's efficiency may be increased via an analog based controller. Generally, the method 400 may enable the voltage regulator to adjust its number of operating phases, switch configuration, and/or dead-time values in response to a load current. Furthermore, the method may also be repeated in response varying load conditions.

First, in step 410 a default voltage regulator configuration may be initialized. Step 410 may include enabling a default number of operating phases i.e., one or more operating phases, initializing a switch configuration, and/or initializing a dead-time value. A switch configuration may be any desired starting configuration, and a dead-time value may be any value. For example, a voltage regulator may have a two high-side and two low-side switch configuration with a dead-time value of 40 ns and four operating phases. Next, the load current may be sensed in step 420, and if the load current has reached a predetermined value, the voltage regulator configuration corresponding to the desired efficiency may be determined in step 430.

Step 440 lists the configurations that may provide relatively high efficiencies for the voltage regulator depending on whether the load current through the voltage regulator falls under a select number of load ranges i.e., predetermined values. Therefore, depending on the load current reading, the voltage regulator may adapt to one of the listed configurations in step 440. For example, for a load current in a load range between 28 A and 60 A, the most efficient configuration may be a voltage regulator operating in four phases, with one high-side switch and one low-side switch, and with a dead-time value of 20 ns. It should be noted, however, that these configurations correspond to the graph illustrated in FIG. 3 and are therefore merely examples. The present disclosure contemplates all such configurations and adjustments under all other conditions, inputs, outputs, load ranges, and/or the like. In step 450, a step is made to determine whether the system has been disabled, i.e., the voltage regulator has been turned off. If it has not, then the method 400 may continue monitoring the load current and sending such information to the controller section of the voltage regulator. Otherwise, the method 400 ends.

Figure 5:
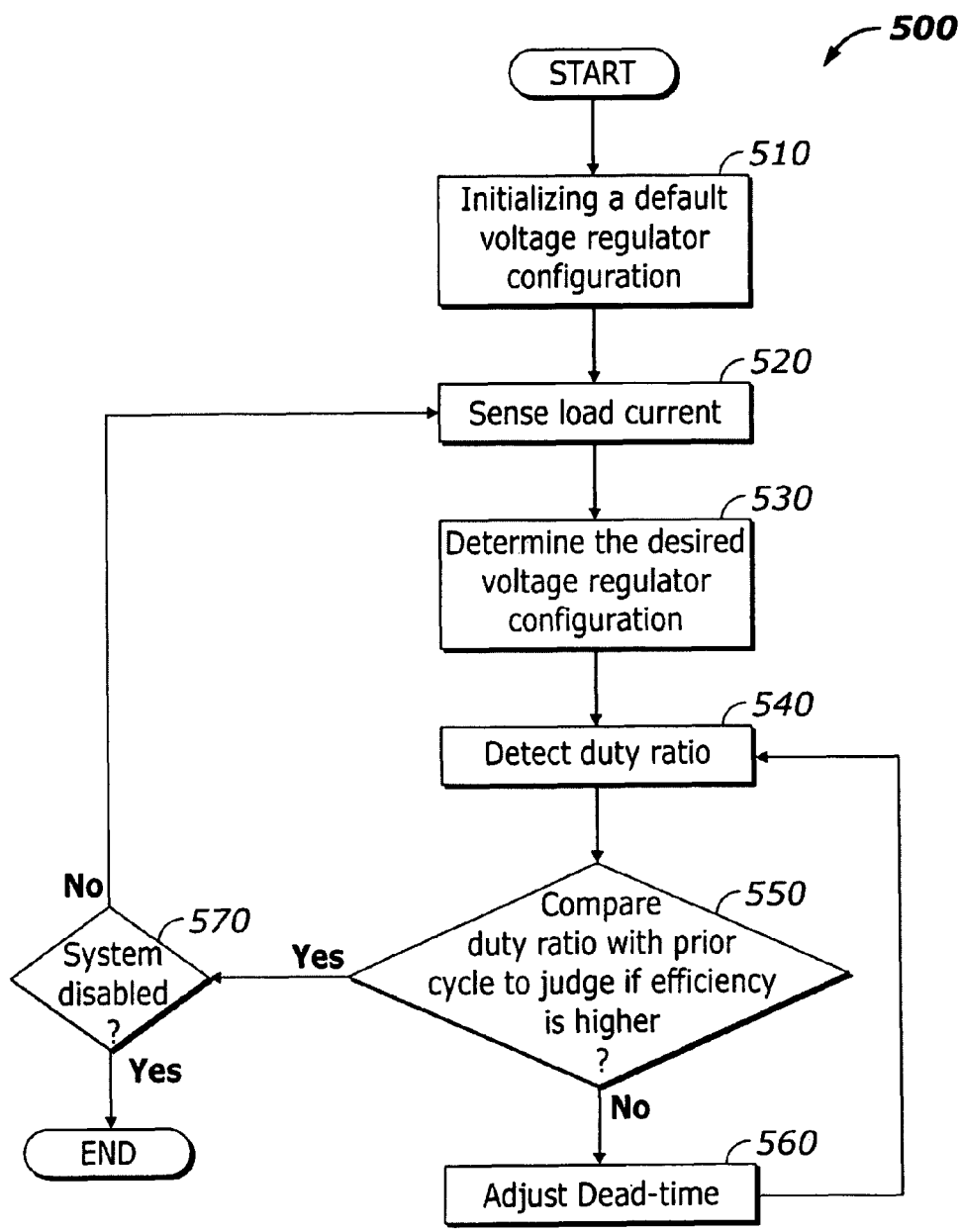
FIG. 5 provides a flow diagram illustrating a method for increasing the efficiency of a voltage regulator in accordance with another aspect of the present disclosure.

Turning now to FIG. 5, another method indicated generally at 500, is provided for increasing a voltage regulator's efficiency using a digital controller. This method 500 may be distinct from that of FIG. 4, which pertains to an analog controller though some similarities may still exist. For example, in step 510, a default voltage regulator configuration may be initialized. As previously mentioned, this step may include enabling a default number of operating phases, initializing a default switch configuration, and/or initializing a default dead-time value. Furthermore, in step 520, the load current may be sensed, and the desired voltage regulator configuration may be set in step 530. With respecting to the voltage regulator configuration, step 530 may correspond to steps 430 and 440 in FIG. 4.

In step 540, the duty ratio of the system is detected via either a control section within the voltage regulator or by any other external component. Duty ratio may be defined as the percentage of time a high-side switch is on versus the total switching cycle. For a switch that turns on and off at regular intervals, the switching cycle, which may also be referred to as the switching period, may refer to the time necessary for a switch to be turned on, turned off, and then turned back on again. Moreover, the duty ratio may provide an indication toward the overall efficiency of the voltage regulator. More specifically, the relationship between the duty ratio and the efficiency of the voltage regulator may be expressed in a formula: $D \sim (V_{out} \times F_{operation}/(V_{in} \times Efficiency))$ or $Efficiency \sim (V_{out} \times F_{operation})/(v_{in} \times D)$. Under this formula, D may refer to the duty ratio while Efficiency may refer to that of the voltage regulator. Vin may be the voltage input while Vout may be the voltage output. Finally, Foperation may refer to a modified factor close to a value of one and may take into consideration external factors including, but not limited to, airflow, resistive losses, and power losses. Notably, this formula may imply an inverse relationship between the duty ratio and the efficiency of the voltage regulator, i.e, as the duty ratio decreases, the efficiency may increase.

Thus, the duty ratios between cycles may be compared, as in step 550. For example, a first duty ratio corresponding to the present switching cycle may be compared with a second duty ratio corresponding to the prior switching cycle. If the first duty ratio exceeds the second duty ratio, such a condition may imply a decrease in the efficiency of the voltage regulator. If so, the dead time may be further adjusted in step 560 to achieve the desired efficiency level, and the method 500 may then loop back to step 540 to once again detect/monitor the duty ratio. If, on the other hand, the comparison of the first duty ratio and the second duty ratio implies that a higher efficiency, has already been obtained in step 550, the system may be checked as to whether it has been disabled in step 570. If not, the system returns to monitoring the load current in step 520. Otherwise, the method 500 ends.

The methods and system of the present disclosure may enable the realization of certain efficiency increases within a voltage regulator. For example, as previously exhibited by FIG. 3, various switch configuration and dead-time values can have different impacts on the efficiency of the voltage regulator depending on the load current. Therefore, in order to minimize the power loss within the voltage regulator, the present disclosure may allow dynamic adjustment of the switch configuration, dead time values, and operating phases depending on the load current.

Furthermore, methods of the present disclosure, detailed description and claims may be presented in terms of logic, software or software implemented aspects typically encoded on a variety of media or medium including, but not limited to, computer-readable medium/media, machine-readable medium/media, program storage medium/media or computer program product. Such media, having computer-executable instructions, may be handled, read, sensed and/or interpreted by an IHS. Generally, computer-executable instructions, such as program modules, may include routines, programs, objects, components, data structures, and the like, which perform particular tasks, carry out particular methods or implement particular abstract data types. Those skilled in the art will appreciate that such media may take various forms such as cards, tapes, magnetic disks (e.g., floppy disk or hard drive) and optical disks (e.g., compact disk read only memory ("CD-ROM") or digital versatile disc ("DVD")). It should be understood that the given implementations are illustrative only and shall not limit the present disclosure.

Although the present disclosure has been described with reference to particular examples, embodiments and/or implementations, those skilled in the art will recognize that modifications and variations may be made without departing from the spirit and scope of the claimed subject matter. Such changes in form and detail, including use of equivalent functional and/or structural substitutes for elements described herein, fall within the scope of the appended claims and are intended to be covered by this disclosure.

What is claimed is:

1. A method for managing a voltage regulator in an information handling system (IHS), the method comprising:
    enabling one or more operating phases associated with the voltage regulator;
    initializing a switch configuration within the voltage regulator, the switch configuration having at least one high-side switch and at least one low-side switch;
    initializing a dead-time value greater than a time interval where both the at least one high-side switch and the at least one low-side switch are powered off;
    sensing a load current through the voltage regulator;
    adjusting the number of operating phases, the switch configuration, or the dead-time value in response to the load current reaching a predetermined value;
    repeating the step of adjusting the dead-time value until the first duty ratio no longer exceeds the second duty ratio;
    comparing a first duty ratio corresponding to a present switching cycle with a second duty ratio corresponding to a prior switching cycle and adjusting the dead-time value further if the first duty ratio exceeds the second duty ratio; and determining whether the IHS is disabled if the first duty ratio no longer exceeds the second duty ratio.

2. The method of claim 1, wherein initializing the switch configuration comprises powering on or off the at least one high-side switch.

3. The method of claim 1, wherein initializing the switch configuration comprises powering on or off the at least one low-side switch.

4. The method of claim 3, wherein each of the at least one high-side switch and the at least one low-side switch is a metal-oxide-semiconductor-field-effect-transistors (MOSFETs).

5. The method of claim 4, wherein the voltage regulator comprises a shedding control to adjust the switch configuration.

6. The method of claim 1, wherein the switch configuration comprises two high-side switches and two low-side switches.

7. An information handling system (IHS) comprising:
a central processing unit (CPU); and
a voltage regulator in communication with the CPU and providing a load current to the IHS, the voltage regulator comprising:
a first driver in communication with a high-side switch, wherein the first driver comprises a first shedding control;
a second driver in communication with a low-side switch, wherein the second driver comprises a second shedding control; and
a control section in communication with the first driver and the second driver, wherein the control section is operable to determine whether a load current has reached a predetermined value and in response to the load current reaching the predetermined value, implementing a given switch configuration having a given dead-time value determined as a function of the off time of the switches in the given switch configuration, wherein the control section comprises:
circuitry operable to compare a first duty ratio corresponding to a present switching cycle with a second duty ratio corresponding to a prior switching cycle;
a dead-time control to:
adjust a dead-time value if the first duty ratio exceeds the second duty Ratio; and
determine whether the IHS is disabled if the first duty ratio no longer exceeds the second duty ratio.

8. The system of claim 7, wherein the voltage regulator is operable to enable or disable one or more predetermined operating phases in response to the load current reaching the predetermined value.

9. The system of claim 7, wherein the first shedding control is operable to turn on or off the high-side switch in response to the load current reaching the predetermined the value and the given dead-time value corresponds to a time interval where both the high-side switch and the low-side switch are off.

10. The system of claim 9, wherein the second shedding control is operable to turn on or off the low-side switch in response to the load current reaching the predetermined value.

11. The system of claim 7, wherein the first driver further comprises a first dead-time control, and wherein the second driver further comprises a second dead-time control, the first dead-time control and the second dead-time control operable to adjust a dead-time value if the first duty ratio exceeds the second duty ratio.

12. A method for managing a voltage regulator configured to enable one or more operating phases, the method comprising:
determining whether a load current has reached a predetermined value;
adjusting the number of operating phases and a switch configuration if the load current has reached the predetermined value, wherein the switch configuration comprises at least one high-side switch and at least one low-side switch;
initializing a dead-time value greater than a time interval where both the at least one high-side switch and the at least one low-side switch are powered off;
comparing a first duty ratio corresponding to a present switching cycle with a second duty ratio corresponding to a prior switching cycle and adjusting the dead-time value further if the first duty ratio exceeds the second duty ratio; and
determining whether an information handling system is disabled if the first duty ratio no longer exceeds the second duty ratio.

13. The method of claim 12, wherein each of the at least one high-side switch and the at least one low-side switch is a metal-oxide-semiconductor-field-effect-transistors (MOSFETs).

14. The method of claim 12, wherein the switch configuration comprises two high-side switches and two low-side switches.

15. The method of claim 12, wherein the voltage regulator comprises a shedding control to adjust the switch configuration.

* * * * *